US005585990A

United States Patent [19]
Manning et al.

[11] Patent Number: 5,585,990
[45] Date of Patent: Dec. 17, 1996

[54] ELECTRONIC MOTOR PROTECTION APPARATUS

[75] Inventors: William R. Manning, Wrentham; Jeffrey P. Rudd, Stoughton; Byron T. Yarboro, Attleboro; Stanley J. Nacewicz, Plainville, all of Mass.

[73] Assignee: Texas Instruments Incorporated, Dallas, Tex.

[21] Appl. No.: 444,446

[22] Filed: May 19, 1995

Related U.S. Application Data

[63] Continuation of Ser. No. 260,627, Jun. 16, 1994, abandoned, which is a continuation of Ser. No. 943,254, Sep. 10, 1992, abandoned.

[51] Int. Cl.$^6$ ........................................................ H02H 5/04
[52] U.S. Cl. .................................. 361/25; 361/28
[58] Field of Search .................... 361/22–29, 18, 361/106, 715, 716, 730, 732, 740, 752, 823, 824; 174/50, 52.1, 52.2

[56] References Cited

U.S. PATENT DOCUMENTS

| | | | |
|---|---|---|---|
| 4,281,358 | 7/1981 | Plouffe et al. | 361/22 |
| 4,456,871 | 6/1984 | Stich | 323/217 |
| 4,539,618 | 9/1985 | Stich | 361/94 |
| 4,636,920 | 1/1987 | Cook et al. | 174/52.2 |
| 4,851,609 | 7/1989 | Reddy | 174/52.1 |
| 5,170,327 | 12/1992 | Burroughs | 361/728 |
| 5,206,572 | 4/1993 | Farag et al. | 361/24 |

FOREIGN PATENT DOCUMENTS 3311213 10/1983 Germany .

OTHER PUBLICATIONS

Product Bulletin: HV–2405E–World Wide Single Power Supply–Harris Semiconductor Co., Aug. 1992.

*Primary Examiner*—A. D. Pellinen
*Assistant Examiner*—Ronald W. Leja
*Attorney, Agent, or Firm*—Russell E. Baumann; Richard L. Donaldson; René E. Grossman

[57] ABSTRACT

An electronic motor protection system is shown having a power supply usable with multivoltage supplies and providing protection from over-temperature conditions caused by various fault conditions. The system also has optional features of a time delay for re-energization and for low voltage protection. The system is mounted on a circuit board and encased in potting material which also locks the two housing parts together. A miswiring feature is also provided to prevent connecting line voltage to the control circuit or sensor terminals.

12 Claims, 3 Drawing Sheets

ELECTRONIC MOTOR PROTECTION APPARATUS

This application is a Continuation of application Ser. No. 08/260,627, filed Jun. 16, 1994, in turn a Continuation application Ser. No. 07/943,254, filed Sep. 10, 1992 now both abandoned.

This invention relates generally to protection apparatus for electric motors and more specifically to electronic protection systems particularly suitable for compressor motors.

Systems for protecting dynamoelectric machines from over-temperature conditions comprising one or more thermal sensors, such as positive temperature coefficient (PTC) of resistivity sensors, disposed in heat transfer relationship with the windings of the motor are well known in the prior art. It is also well known to add other protective functions to such systems which will protect various apparatus from the occurrence of additional conditions in an economical and efficient manner. For example, once the supply of power to a load has been interrupted, either through the sensing of an over-temperature condition by the PTC sensors and concomitant tripping of the protection circuit, the opening of a contactor or for any other reason, it is undesirable to permit reapplication of power to certain loads, such as air conditioner compressors, until after a certain period of time has elapsed thereby permitting the load to return to a condition suitable for re-energization. In the case of compressors a short time delay allows equalization of pressure in the compressor so that less starting torque is required.

A system which accomplishes the above functions in an effective manner as well as providing additional protective features such as oil pressure protection to ensure that the system is not operated when oil pressure falls below a safe value for more than a selected time interval and a low voltage feature to avoid the possibility of causing contact chattering or having one phase of a multiphase motor drop out which would cause overworking of the remaining phases is shown and described in U.S. Pat. No. 4,281,358 assigned to the assignee of the present invention.

In the system described in the referenced patent the protection system has a power supply including a conventional transformer to convert outside supply voltage to a selected lower voltage suitable for operation of the control circuit. In that patent the control circuit utilizes a 24 volt supply so that separate transformer means, or at least a transformer with selected taps has to be utilized with different line voltage supplies. This results in having to provide different models of the protection system for different line voltage applications.

It is an object of the invention to provide an electronic motor protector providing multifunction protection which can be used with a plurality of different line voltages. Another object is the provision of an inexpensive yet reliable motor protection system. Still another object is the provision of such a system which is compact in size and light in weight.

Briefly, in accordance with the invention, a solid state power supply comprising an integrated circuit having a first switching pre-regulator section and a second voltage regulator section is used to provide a selected DC voltage. The switching pre-regulator conducts for a portion of the positive half of the AC line cycle which is used to charge a capacitor which in turn is coupled to the voltage regulator to provide a first level of DC voltage. According to the invention the first level of DC voltage is used to directly drive a relay to control energization of the motor contactor. The first level of DC voltage is in turn stepped down by a limiting resistor and a zener diode to provide a second level of DC voltage for energizing the control circuitry.

The control circuitry comprises a plurality of cascaded operational amplifiers in the form of comparator sections providing a single channel including an over-temperature protection section in which one or more PTC thermal sensors are coupled to the inverting input of a first comparator. The output of the first comparator is coupled to a buffer comparator which in turn is coupled to the base of a transistor serially connected to the relay coil. The output of the first comparator is also optionally connected to a time delay comparator whose output is coupled back to the inverting input of the first comparator. The output of the first comparator is also optionally coupled to the output of a low voltage comparator.

According to a feature of the invention the protection system is mounted on a circuit board received in the bottom half of a housing which is encased with potting material to provide vibration insensitivity, environment protection and to meet agency standard spacing requirements. The top half of the housing has a plurality of ribbed depending skirts adapted to extend into the potting material to lock the housing parts together. According to another feature of the invention the input blade line terminals of the system are configured smaller than the sensor or output terminals to obviate any possibility of miswiring by putting line voltage across the control circuit or sensor circuits.

BRIEF DESCRIPTION OF THE DRAWINGS

Other objects, advantages and details of the novel and improved protection apparatus of the invention appear in the following detailed description of the preferred embodiment, the detailed description referring to the drawings in which.

DESCRIPTION OF THE PREFERRED EMBODIMENTS

Figure 1:
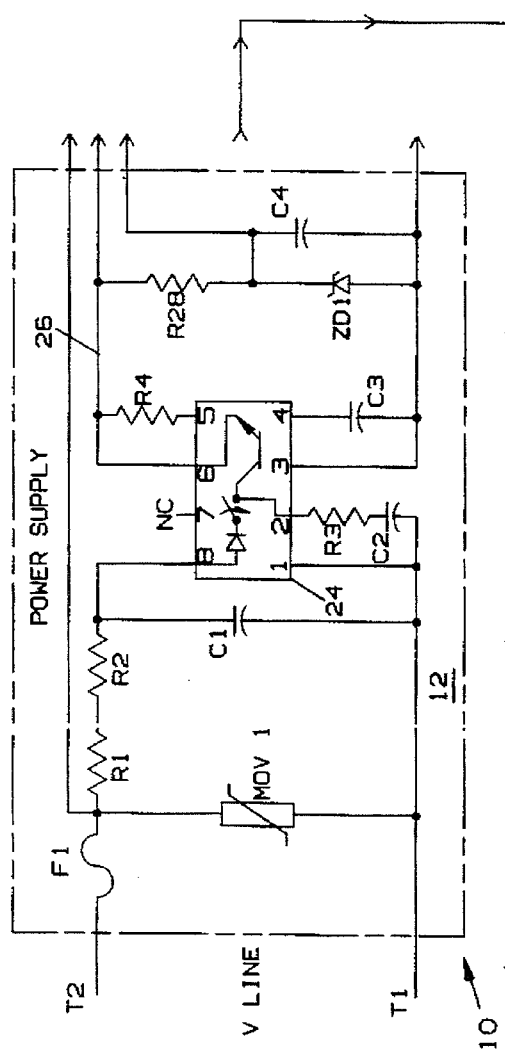
FIG. 1 is a schematic circuit diagram of the protection apparatus made in accordance with the invention.
Figure 1:
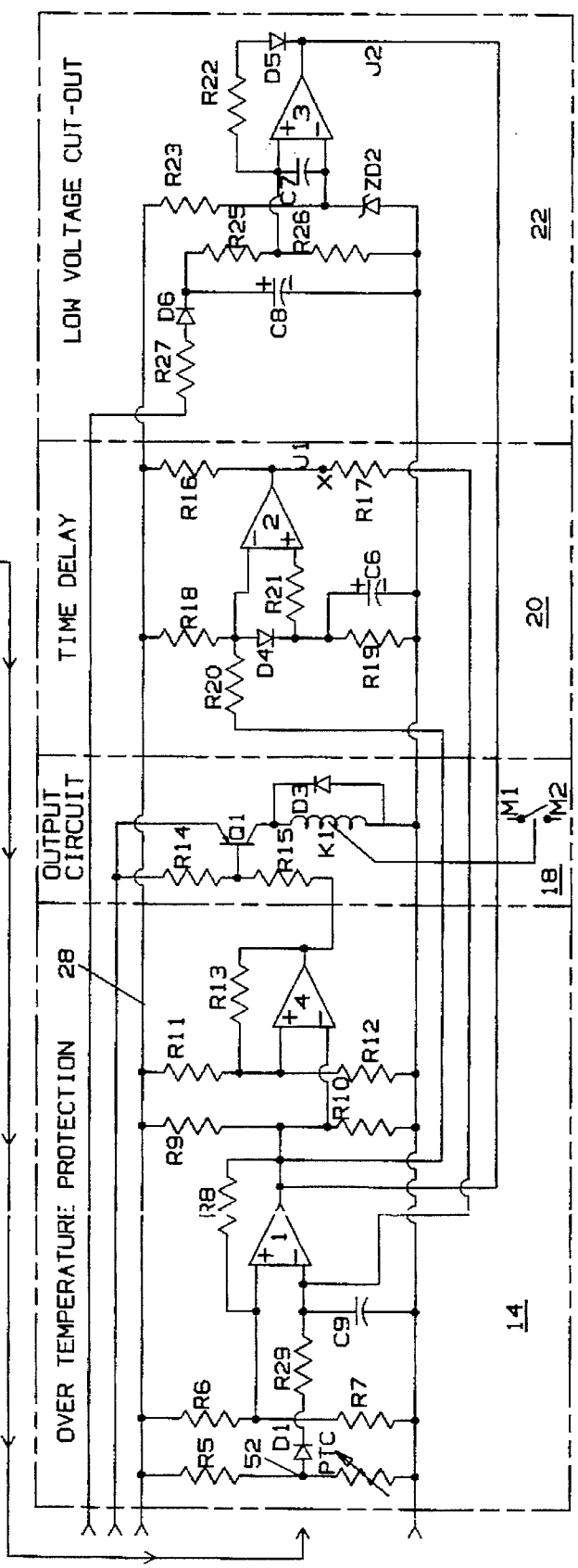

With reference to FIG. 1, protection apparatus 10 made in accordance with the invention comprises a power supply section 12, over-temperature protection section 14, output circuit 18, time delay section 20 and low voltage cut-out section 22. Each of sections 14, 16, 20 and 22 includes an operational amplifier comparators 1 and 4 in section 14, 2 and 3 respectively each having an NPN output transistor (open collector). During steady state operating conditions the output transistor of comparator 1 is off, the output transistor of comparator 4 and 2 are on, and the output transistor of comparator 3 is off. As will be explained in detail below, when an over-temperature condition occurs it will cause the output transistor of comparator 1 to turn on and the output transistor of comparators 4 and 2 to turn off (comparator 3 still being off). When low voltage conditions occur the output transistor of comparators 1, 4 and 2 are off and the output transistor of comparator 3 turns on.

With regard to specific sections of circuit 10, power supply section 12 comprises a fuse F1 connected to the AC high, terminal T2 as a safety feature so that in the event of a short circuit the apparatus will fail with an open circuit. A surge suppressor varistor MOV1 is coupled across the AC high terminal T2 and AC return terminal T1 to clamp high frequency and high energy transients such as lightning surges. Resistors R1, R2 and capacitor C1 connected across the AC lines serve as a low pass filter to filter high frequency noise and line spikes. Additionally, resistors R1, R2 serve as current limiting devices for the SCR based pre-regulator to be discussed below.

Circuit section 10 includes a single chip power supply, integrated circuit 24 comprising two sections, a switching pre-regulator and a linear post or voltage regulator. The IC has eight pins, only seven of which are utilized, pin 7 being unconnected. Pin 8 serves as an input pin and is connected to the AC high line T2 through resistors R1, R2 and to an internal switch which connects pin 8 with pin 2. Pin 2 is also connected to the input of the voltage regulator section.

An external energy storage capacitor C2 has one side connected to pin 2 and its opposite side connected to AC return T1. Pin 1, connected internally to pin 3, is also connected to AC return T1. When the input voltage goes positive the internal switch comprising a diode connected to the main electrodes of an SCR allows current to flow through resistor R3 charging capacitor C2. When the voltage on capacitor C2 reaches a level of the output voltage at pin 6 plus a voltage across a reference circuit within IC 24, the internal switch is turned off and charging of capacitor C2 stops.

The voltage regulator section takes current from capacitor C2 to provide an output voltage on pin 6 which is set by feedback to sense pin 5 which is connected internally in IC 24 to an amplifier stage and in turn coupled to output pin 6. The output will rise to a voltage level necessary to keep sense pin 5 at 5 volts and may be adjusted above the 5 volt reference by placing a selected resistance or zener diode between pins 5 and 6. An additional volt is provided for each one thousand ohms. As seen in FIG. 1, resistor R4 of 19 Kohms is chosen to provide a 24 volt DC supply on line 26 for relay coil K1 and associated contacts M1, M2.

Pin 4 is coupled internally in IC 24 to the voltage reference circuit and when shorted to T1 will turn the internal switch off. A safety feature is provided to keep the internal switch off during large dv/dt transients by means of connecting an inhibit capacitor C3 between pin 4 and pin 1 (T1-AC return) so that when subjected to large dv/dt transients the effective impedance of C3 becomes negligible thereby turning off the internal switch.

Figure 2:
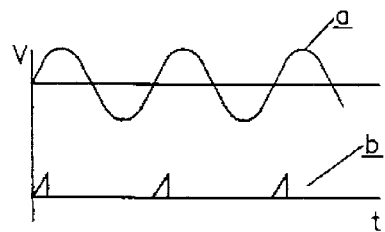
FIG. 2 is a voltage vs time graph showing line voltage and voltage at the IC pin of the switching pre-regulator.

With reference to FIG. 2 which shows the voltage vs time curve at a of line voltage, typically 60 Hertz frequency and at b the waveform as seen at pin 8 by selecting an appropriate current limiting resistance for resistors R1, R2 the SCR conduction of the pre-regulator section typically in the order of 1 millisecond for a 60 Hertz frequency occurring on the positive half of the AC cycle.

A lower voltage, i.e., 12 volts, suitable for operation of the control circuit, to be explained infra, is provided by suitable means such as a dropping resistor R28 serially connected to a 12 volt zener diode ZD1 connected between the output of IC 24 and ground. Power supply section 12 also includes a snubber capacitor C4 connected between the low voltage output at the junction of resistor R28 and diode ZD1 and ground. Alternatively, the low voltage power supply could be provided by a voltage divider comprising two resistors, if desired.

Over-temperature protection section 14 comprises a comparator 1 having its inverting input connected, through diode D1, resistor R29 and capacitor C9 to the junction of a reference resistor R5 and a PTC resistor which are connected between control circuit supply voltage 28 and ground. Diode D1 serves to isolate resistor R5 and the PTC from any feedback from the supply rail 28 through resistors R16, R17 when the output transistor of comparator 2 is off and the inverting input is tied to the 12 volt rail. The non-inverting input of the comparator 1 is connected to the junction of voltage divider resistors R6, R7 connected between line 28 and ground to establish a reference voltage. Feedback resistor R8 is connected between the output of comparator 1 and the non-inverting input. Capacitor C9 is connected between the inverting output of comparator 1 and ground. The RC network of resistor R29 and capacitor C9 snubs down noise transients on the sensor input thereby preventing nuisance tripping.

The output of comparator 1 is connected to the junction of a voltage divider in a buffer circuit portion comprising resistors R9, R10 and the junction in turn is connected to the inverting input of comparator 4. The non-inverting input is connected to the junction of a voltage divider comprising resistors R11, R12. Feedback resistor R13, providing hysteresis which in turn provides a clear demarcation for switching of comparator 4 and avoiding contact chatter, is connected between the output of comparator 4 and the non-inverting input. The output of comparator 4 is connected to the output voltage line 26 of IC 24 through resistors R14, R15 in output circuit 18. The emitter, collector terminals of PNP transistor Q1 are serially connected between supply line 26 and relay coil K1 which in turn is connected to ground. The base of the transistor is connected to the junction of resistors R14, R15. Diode D3 is coupled across relay coil K1 to prevent back EMF, thereby protecting transistor Q1.

As stated supra, a fixed voltage reference provided by voltage divider R6, R7 establishes a threshold level at the non-inverting input of comparator 1. The variable voltage provided by the PTC sensor comprises the variable voltage at the inverting terminal of comparator 1 which varies according to the change in the resistance of the PTC dependent on changes in temperature of the PTC. When the voltage at the inverting terminal exceeds that of the non-inverting terminal the output NPN transistor of comparator 1 is biased on thereby sinking current to ground. This results in the reference voltage at the non-inverting input of comparator 4 being greater than the voltage at the inverting input of comparator 4 resulting in the output transistor of comparator 4 to be biased off preventing current flow to ground for transistor Q1 and concomitantly de-energizing the relay coil K1 opening contacts M1, M2 and, in turn, the motor. Feedback resistor R8 provides hysteresis to prevent transistor Q1 from being biased on until the PTC element has cooled to its normal operating resistance level at which time the circuit will reset and permit energization of coil K1, contacts M1, M2 and the motor.

Time delay section 20 is an optional feature comprising comparator 2 whose non-inverting input is connected through resistor R21 to a point between resistor R19 and diode D4 to the junction of resistors R18 and R20. Resistor R18 is connected to the supply rail 28 while resistor R20 is connected to the output of comparator 1. The inverting input of comparator 2 is connected to the junction of resistors R18 and R20. The RC network comprising capacitor C6 coupled around resistor R19 provides the selected time delay. A resistance value of 1.1 MEG. ohms for resistor R19 provides a four minute delay using 100 uf for capacitor C6. By using a resistance value of 500K ohms for R19 a two minute delay is provided. Resistor R21 prevents discharge current from capacitor C6 from going back into the non-inverting terminal. The output of comparator 2 is connected to the junction of resistors R16, R17 which are connected between supply line 28 and the inverting input of comparator 1. During steady state operation of a motor the input voltage at the inverting terminal of comparator 2 exceeds that of the non-inverting terminal due to the voltage drop of diode D4 with the output transistor biased on. When the module trips due to an over-temperature condition, or the like, the output transistor of comparator 1 is biased on sinking current from resistor R20 to ground thereby lowering potential between voltage divider R18, R20 so that voltage at non-inverting terminal of comparator 2 exceeds that of the inverting terminal and the output transistor of comparator 2 is biased off. Since the output of comparator 2 is tied to the inverting input of comparator 1 it keeps the inverting input of comparator 1 tied to the supply rail 28 until capacitor C6, discharging through resistor R19, decreases to a value lower than the voltage at the inverting input of comparator 2 and the circuit is then reset. Diode D4 prevents any current from capacitor C6 back feeding to the supply rail.

Low voltage cut-out circuit section 22 is another optional feature and it comprises comparator 3 whose non-inverting input terminal is connected to the junction of resistors R25, R26 which are connected through diode D6 and resistor R27 between AC line voltage and ground with capacitor C8 coupled across resistors R25, R26. The inverting input terminal of comparator 3 is connected between resistor R23 and zener diode ZD2 connected between supply line 28 and ground to provide a reference voltage. The output of comparator 3 is connected to the output of comparator 1. Feedback resistor R22 and diode D5 are connected between the output of comparator 3 and the non-inverting input thereof. Resistor R22 provides hysteresis to avoid problems with the ripple voltage associated with charging of capacitor C8. When a motor is first energized resistor R22 and diode D5 are in parallel with resistor R26; however, once the peak of the ripple voltage charging capacitor C8 exceeds the reference voltage of zener diode ZD2 causing a change of state of comparator 3 resistor R22 is effectively removed with the voltage at the non-inverting input of comparator 3 going significantly higher, e.g., from approximately 3.2 V to approximately 5 V. Capacitor C7 is connected between the input terminals of comparator 3 to suppress any high frequency transients at the input terminals.

During normal operation the output transistor of comparator 3 is off and the potential of the inverting input of comparator 3 is less than the potential at the non-inverting input. When line voltage starts to decrease thereby decreasing the voltage at the non-inverting terminal below the preselected level thereby biasing the output transistor of comparator 3 on. Current flows from supply rail 28 and since the output transistor of comparator 1 is off the current flows to ground through output transistor of comparator 3. The inverting input of comparator 4 is than tied to ground making the positive or non-inverting input higher than the negative input turning off the output transistor of comparator 4, so that the base junction of transistor Q1 is no longer tied to ground.

When the time delay option is used if an over-temperature or low voltage condition is sensed a pre-programmed two or four minute delay will be activated preventing energization of the relay (and motor) even though the PTC sensor may have cooled to the reset temperature.

Preferably the time delay function is used whenever the low voltage function is used to prevent undesirable oscillation should the voltage hover near the designed cut-out value. In those cases where it is preferred not to employ these functions they can easily be shorted out using appropriate jumpers to tie the inputs of comparators 2 and 3 to ground and removing jumpers J1 and J2.

A circuit built in accordance with the invention has the following component values:

| | | |
|---|---|---|
| MOV1 | 270V | R1 75 ohms 3W - 5% |
| C1 | .10 uf (275 VAC) | R3 2 ohms - 5% |
| C2 | 470 uf | R4 19K ohms - 1% |
| C3 | 150 pf | R5 2.67K ohms - 1% |
| C4 | 4.7 uf (50V) | R6 75K ohms - 1% |
| C5 | .01 uf | R7 121K ohms - 1% |
| C6 | 100 uf (25V) | R8 182K ohms - 1% |
| C7 | .01 uf | R9 5K ohms - 5% |
| C8 | 4.7 uf (50V) | R10 5K ohms - 1% |
| C9 | .01 uf (50V) | R11 56K ohms - 5% |
| IC 24 | HV3-240E-9 | |
| | Harris Semiconductor Co. | |
| comparator 1 | ⎫ | R12 10K ohms - 5% |
| comparator 2 | ⎬ LM2901 | R13 270K ohms - 5% |
| comparator 3 | ⎭ (Texas Instruments) | R14 7K ohms - 5% |
| comparator 4 | | R15 27K ohms - 5% |
| ZD1 | 12V | R16 218K ohms - 5% |
| ZD2 | 3.9V | R17 330K ohms - 1% |
| Q1 (2N4403; | NPN) | R18 15K ohms - 1% |
| D1 1N 4004 | | R19 1.1M ohms - 1% |
| D2 1N 4004 | | R20 1.8K ohms - 1% |
| D3 1N 4004 | | R21 470K ohms - 5% |
| | | R22 75K ohms - 1% |
| D4 1N 4004 | | R23 2.7K ohms - 5% |
| D5 1N 4004 | | R25 22K ohms - 1% |
| D6 1N 4004 | | R26 R Select ohms - 1% |
| Relay | 24V | R27 169K - 1% |
| | Omron G2R | R28 1K - 1% |
| | | R29 150K - 1% |
| | | PTC 1.0K BA Sensor |
| | | (Texas Instruments) |

Figure 3:
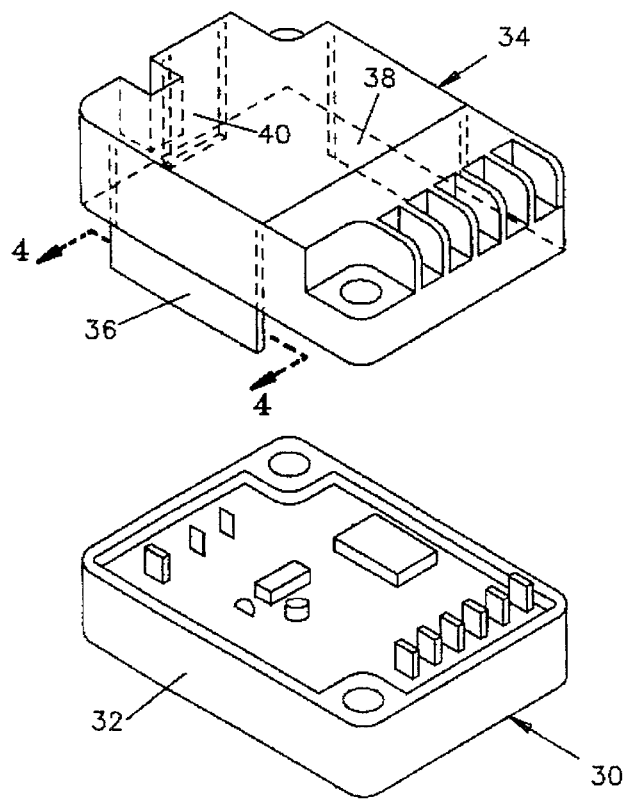
FIG. 3 is a blown apart perspective of the upper and lower housings of the protection apparatus made in accordance with the invention.
Figure 4:
FIG. 4 is a cross sectional view taken on line 4—4 of FIG. 3.

With reference to FIG. 3 the circuit components of FIG. 1 mounted on a suitable circuit board are received in the bottom housing half 30 having upstanding wall 32 infilled with a suitable electrically insulative but thermally conductive potting material such as two part epoxy (2850FTFR with catalyst LN2636-101) available from Emerson and Cuming Inc. Use of the epoxy potting provides insensitivity to vibration and facilitates locking of the top housing half 34 to half 30. Top housing half 34 is provided with downwardly depending skirt portions 36, 38, 40 which are received inboard of wall 32 prior to the curing of the epoxy and are of a length such that the distal free end of the skirts are spaced from the circuit board by approximately 0.001 inch to provide suitable holding area for the epoxy to adhere to. To further enhance the effectiveness of the lock the skirts are preferably provided with a plurality of lands and grooves 42, 44 as shown in FIG. 4.

Figure 5:
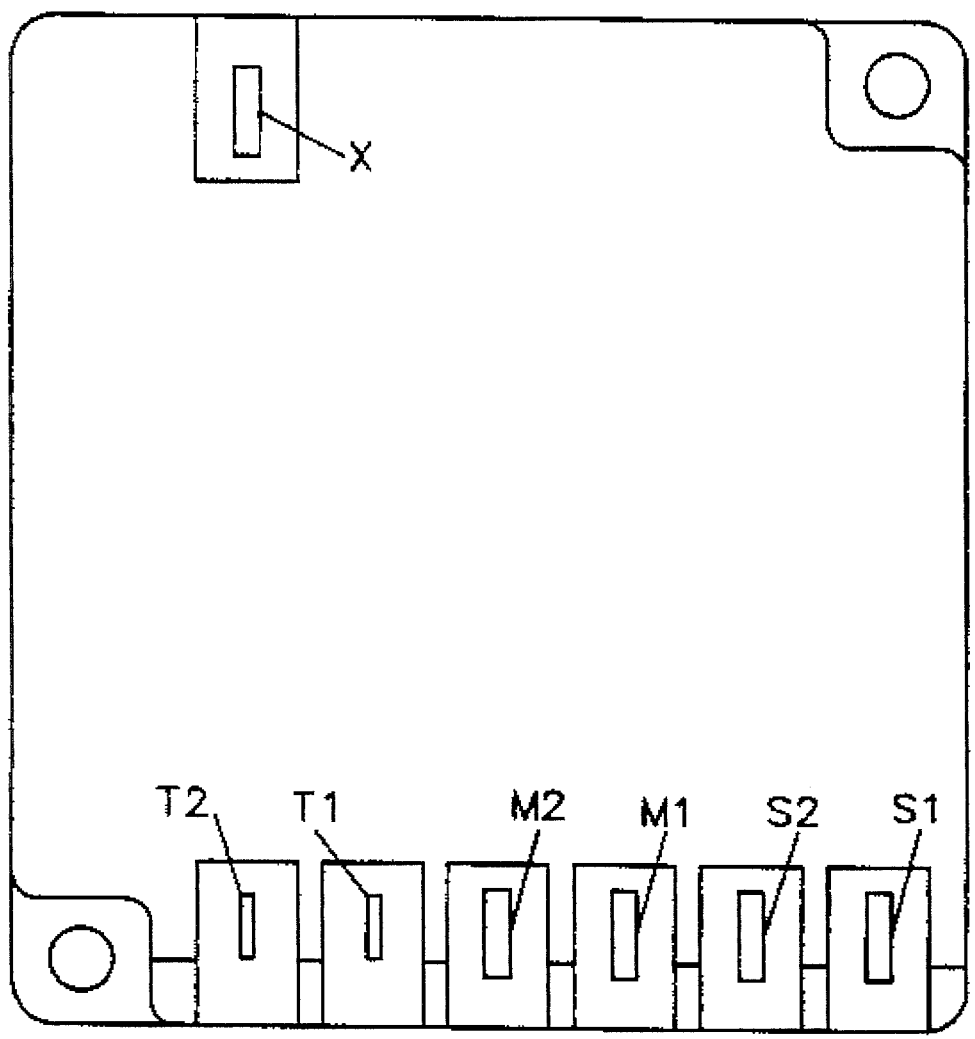
FIG. 5 is a top view of an assembled protection apparatus shown in FIG. 3.

Terminals T2, T1, M2, M1 and S2, S1 project upwardly from the epoxy and are received through terminal apertures in housing half 34. As best seen in FIG. 5 terminal block members T2, T1 are smaller than the remaining terminals in order to ensure that line power will not be connected to the output or sensor terminals. This obviates potential miswiring by field personnel or the like which otherwise could result in damaging the control circuit.

Terminal X, shown in FIGS. 1, 3 and 5 is used to disable the time delay feature connecting point X with S1 so that other features of the circuit can be tested more expeditiously.

Use of the power supply described above enables the over-temperature protection system to be used with a wide range of line voltages, from 30 to 264 $V_{rms}$ without any change in the system's components or in the way that the system is connected to line voltage. Thus the over-temperature protection portion of the system can readily be used with 120 or 240 VAC applications. Additional advantages are obtained since the transformer, along with the diode rectifier network of the prior art, is replaced by the IC 24 thereby resulting in a reduction in size and weight of the system. Cost reduction is also achieved by replacing a conventional triac and its accessories with a low cost relay. The protection system built in accordance with the invention is not only less expensive due to the elimination of the transformer and reduction of inventory parts it is more reliable and is easily manufactured.

The protection system is particularly suitable for use with refrigerant compressor motors to provide protection from overheating due to locked rotor, running overload, light loads, loss of charge and high discharge gas temperature conditions. The system can be provided with or without the low voltage cut-out and time delay features.

It should be understood that though preferred embodiments of the invention have been described by way of illustrating the invention, the invention includes all modifications and equivalents of the disclosed embodiments falling within the scope of the appended claims.

We claim:

1. An electronic motor protection system for de-energizing a motor upon the occurrence of selected over temperature conditions comprising a housing, the housing mounting a power supply section, control circuitry for detecting the existence of the selected conditions and an output circuit responsive to a signal from the control circuitry for controlling the state of energization of the motor, the power supply section comprising an integrated circuit including solid state switch means having a switching pre-regulator connected across line voltage adapted to turn on every cycle for a minor portion of one-half cycle beginning at zero crossing of the AC voltage wave and having a voltage regulator, a capacitor coupled to the pre-regulator of the solid state switch means to be charged by current conducted through the solid state switch means during the said minor portion, the capacitor coupled to the voltage regulator to provide load current, a feedback component external of the solid state switch means coupled to the voltage regulator to provide a preselected level of DC output voltage, the output circuit comprising a relay coil serially connected to a solid state switch having a base, the coil and solid state switch being connected across the selected level of DC output voltage, the control circuitry coupled to the power supply section comprising a voltage divider network including a temperature dependent resistor for developing a variable voltage which varies in accordance with the temperature of the temperature dependent resistor, first comparator means, a fixed reference voltage, the fixed reference voltage and the variable voltage connected to the first comparator means for comparing the developed variable voltage with the reference voltage, the first comparator means having an output coupled to the base of the solid state switch in the output circuit and being adapted to control the conduction of the solid state switch and concomitantly the energization of the relay coil in dependence upon whether the developed variable voltage is above or below the reference voltage, the housing including top and bottom members, the bottom member having upstanding walls, a circuit board mounting circuit components including the power section, the control circuitry and the output circuit thereon received in the bottom member, curable potting material received in the bottom member encasing the circuit board and received around the circuit components to enhance vibration insensitivity of the system, the top member having a top wall and depending sidewall and having skirts depending downwardly beyond the sidewall and adapted to be received inside the upstanding wall of the bottom member extending into the potting material prior to curing thereof to securely lock the two members together.

2. An electronic motor protection system according to claim 1 in which the power supply section includes step down means to provide a selected lower DC voltage for the control circuitry.

3. An electronic motor protection system according to claim 2 in which the step down means includes a serially connected current limiting resistor and zener diode.

4. An electronic motor protection system according to claim 1 further including a buffer circuit comprising a second comparator means having an inverting input terminal interposed between the first comparator means and the output circuit, the output of the first comparator means connected to the inverting input terminal and the output of the second comparator means connected to the base of the output circuit solid state switch through a resistor.

5. An electronic motor protection system according to claim 4 further including a time delay circuit comprising a third comparator means having an inverting and a non-inverting input terminal, the inverting input terminal coupled to the output of the first comparator means, an RC network coupled to the non-inverting input terminal of the third comparator means and the output of the third comparator means coupled to the inverting input of the first comparator means.

6. An electronic motor protection system according to claim 1 further including a low voltage circuit comprising a fourth comparator means having an inverting and a non-inverting input terminal, the non-inverting input terminal coupled to the line voltage and the inverting input terminal coupled to a second reference voltage, the output of the fourth comparator means coupled to the output of the first comparator means.

7. An electronic motor protection system according to claim 1 in which terminals of a first selected size are provided connected to the temperature dependent resistor and to the relay coil and terminals of a second, smaller selected size are provided connected to an input of the power supply section.

8. An electronic motor protection system according to claim 1 in which the solid state switch means having a switching pre-regulator turns on for approximately 1 millisecond per cycle for a 60 Hertz line voltage.

9. An electronic motor protection system according to claim 1 in which a plurality of lands and grooves are formed in the skirts to increase the surface area thereof.

10. An electronic motor protection system for de-energizing a motor upon the occurrence of selected conditions comprising a housing, the housing mounting a power supply section, control circuitry for detecting the existence of the selected conditions and an output circuit responsive to a signal from the control circuitry for controlling the state of energization of the motor, the power supply section providing a preselected level of DC output voltage, the output circuit comprising a relay coil serially connected to a solid state switch having a base, the coil and solid state switch being connected across the preselected level of DC output voltage, the control circuitry coupled to the power supply circuit comprising a voltage divider network including a temperature dependent resistor for developing a voltage which varies in accordance with the existence and non-existence of the selected conditions, first comparator means having a fixed reference voltage for comparing the developed voltage with a reference voltage, the first comparator means having an output coupled to the base of the solid state switch in the output circuit and being adapted to control the conduction of the solid state switch and concomitantly the energization of the relay coil in dependence upon whether the developed voltage is above or below the reference voltage, the housing having top and bottom members, the bottom member having upstanding walls, a circuit board mounting the power supply section, the control circuity and the output circuit section thereon received in the bottom member, curable potting material received in the bottom member encasing the circuit board, the top member having a top wall and depending sidewall and having skirts depending downwardly beyond the sidewall and adapted to be received inside the upstanding wall of the bottom member extending into the potting material prior to curing thereof to securely lock the two members together.

11. An electronic motor protection system according to claim 10 in which a plurality of lands and grooves are formed in the skirts to increase the surface area thereof.

12. An electronic motor protection system according to claim 10 in which terminals of a first selected size are provided connected to the temperature dependent resistor and to the output relay and terminals of a second, smaller selected size are provided connected to an input of the power supply section.

* * * * *